April 23, 1929. E. HAHN 1,710,577
IMPACT LINER FOR JET CONVEYERS
Filed Feb. 24, 1925
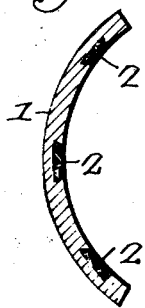
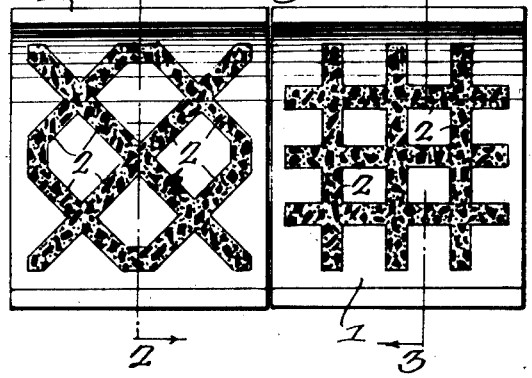
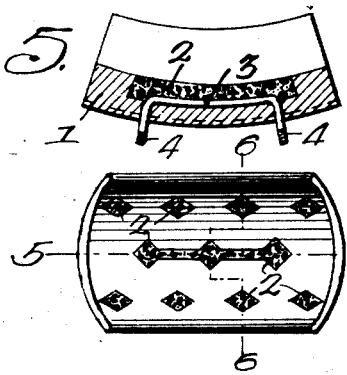
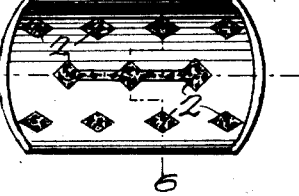
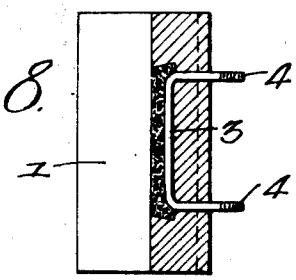
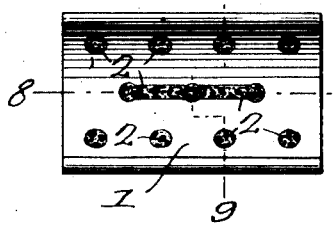
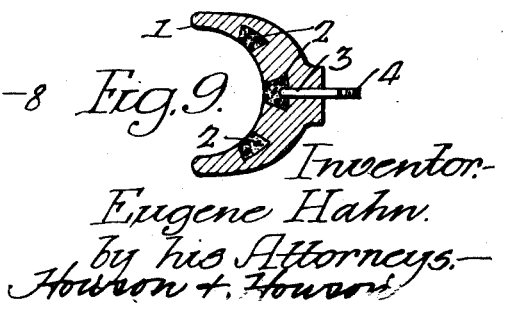
Inventor-
Eugene Hahn.
by his Attorneys.
Howson + Howson Patented Apr. 23, 1929.

1,710,577

UNITED STATES PATENT OFFICE.

EUGENE HAHN, OF PHILADELPHIA, PENNSYLVANIA.

IMPACT LINER FOR JET CONVEYERS.

Application filed February 24, 1925. Serial No. 11,336.

This invention relates to steam or compressed air jet conveyers and pipe line conveyers in general of the type commonly used for transferring ashes from a boiler to a desired point of discharge.

The principal object of the invention is to provide a novel and improved form of liner element capable of withstanding to a much greater extent than heretofore the abrasive effect of the impacting ashes, clinkers or other material passing through the conveyer.

The invention further resides in the provision of novel and improved means for securing the liners in the conveyer.

These and other advantageous ends are obtained by means of construction illustrated in the attached drawings, in which:

Figure 1 is a face view of liner sections made in accordance with the invention;

Figs. 2 and 3 are transverse sections taken on the lines 2—2 and 3—3, Fig. 1;

Fig. 4 is a face view of another form of liner made in accordance with my invention;

Figs. 5 and 6 are sections taken on the lines 5—5 and 6—6, Fig. 4;

Fig. 7 is a face view of still another embodiment of the invention, and

Figs. 8 and 9 are sections respectively on the lines 8—8 and 9—9, Fig. 7.

With reference to the drawings, I have shown for purposes of illustration several liners of the type used with conveyers of the usual cylindrical form. It will be understood, however, that the invention is applicable to any liner, regardless of shape or manner of application to the conveyer. It will further be understood that the invention in its broader aspects is not limited to jet conveyers, since, obviously it may find useful application elsewhere under conditions similar to those found in jet conveyers.

Liners are commonly used in jet conveyers for the purpose of taking the impact of the conveyed materials at points in the conveyer where a change in direction occurs, the wear being taken upon these replaceable parts in preference to the duct itself. Under some circumstances, however, the duct is so made that the impact and wear come upon a replaceable section of the duct proper. The present invention may be employed to increase the resistance to wear and the useful life of these duct sections as well as to provide an exceptionally long-wearing liner.

Liners, as well as the ducts of jet conveyers, are usually made of white cast iron, the liners ordinarily being chilled, and I prefer to use this material for the body 1 of the liner. Instead of solid iron, however, the liner is provided, in the present instance, with inserts 2, of a material harder and more resistant to wear under the conditions of use than the iron, the inserts being exposed on the working face of the liner, the outer surface of said inserts preferably being substantially flush with the adjacent surface of the liner. For the purpose of better holding the inserts in place, the recesses which they occupy may be larger at bottom than at top, they being provided in the present instance with inclined sides converging toward the top, and other means may be employed for this purpose, such as corrugating the sides of the recesses.

The inserts may be formed with a cementitious material pressed into the recesses, the latter being formed in casting the liner body; or the inserts may be preformed and cast into the liner body. Many materials may be employed for the inserts, and bodies or materials containing crystalline alumina, such as employed in the manufacture of abrasives, suggest themselves as particularly desirable by reason of their excessive hardness.

As illustrated, the insert or inserts may take numerous forms, the invention being practically unlimited in this respect.

I have found that where the working face of the liner is broken up and interspersed with areas of a material harder than the liner, the resistance to wear and the life of the liner is materially increased. The presence of the harder areas reduces to a great extent the wear on the face of the liner by the usually abrasive material passing at high velocity through the conveyer duct and gives an efficiency in the liner which in some instances may be greater than that of a liner made entirely from the harder material. This is due to the fact that most abrasive and other extremely hard materials have not in marked degree the characteristic of toughness required to withstand impact, and except in comparatively small and properly reinforced bodies are useless for this purpose. The present construction affords a combination wherein the deficiency of one material is made up by the other with a consequent combined efficiency exceeding that of either.

It is customary to provide studs, usually cast in the liner body, for securing the liner in the conveyer duct. The present invention makes practicable the use of securing means that may be applied after the liner is formed. In Figs. 5, 6, 8 and 9, for example, I show a U-shaped bolt 3 which may be inserted in the bottom of the recess provided for the insert 2, the threaded ends 4, 4, passing through holes in the bottom of the recess to the back of the liner.

As previously stated, the function of the liner is sometimes taken over by a section of the duct proper, and in such cases the inserts may be applied to the duct itself.

I claim:

1. An impact member for pipe line conveyers having a working surface substantially smooth throughout and including areas of differing degrees of hardness.

2. An impact member for pipe line conveyers having a working surface substantially smooth throughout and including areas of different composition.

3. A pipe line conveyer comprising an impact member having spaced inserts in the working face of material harder than the material of said member, the outer surface of said inserts being substantially flush with the adjacent surface of the member.

4. An impact liner comprising a recess in the working face thereof, fastening means for the liner in the bottom of the recess and projecting through the liner body to and beyond the back thereof, and a body of material of greater hardness than the material of the liner occupying the recess over said fastening means.

5. An impact member for pipe line conveyers having at least one insert showing on the working face of said member and of greater hardness than the member, the outer surface of said insert being substantially flush with the adjacent surface of the member and said insert forming a portion only of the effective working face of the liner and reinforcing the areas of lesser hardness.

6. An impact member for pipe line conveyers comprising an appropriately formed body of cast iron having at least one insert showing on the working face of said member and of greater hardness than the member, the outer surface of said insert being substantially flush with the adjacent surface of the member and said insert forming a portion only of the effective working face of the liner and reinforcing the areas of lesser hardness.

7. An impact member for pipe line conveyers having a recess extending inwardly from the working face and formed with a restricted mouth, and an insert in said recess of material more resistant to abrasion than the material of said member, the outer surface of said insert being substantially flush with the adjacent surface of the member and said insert forming a portion only of the effective working face of the liner and reinforcing the areas of lesser hardness.

8. A pipe line conveyer comprising an impact member having inserts in the working face of material harder than the material of said member and of different composition, the outer surface of said inserts being substantially flush with the adjacent surface of the member, said inserts forming a portion only of the effective working face of the liner and reinforcing the areas of lesser hardness.

EUGENE HAHN.